No. 668,362. Patented Feb. 19, 1901.
L. O. TOMLINSON.
SYSTEM OF IRRIGATING ARID SOILS.
(Application filed Jan. 25, 1897.)
(No Model.) 2 Sheets—Sheet 2.
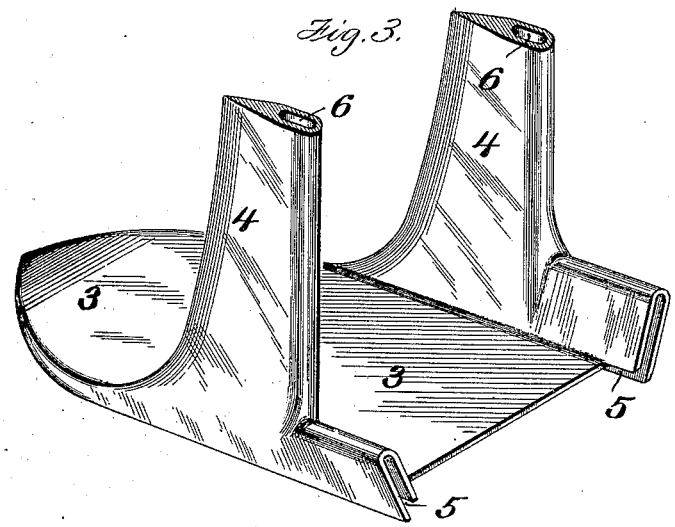
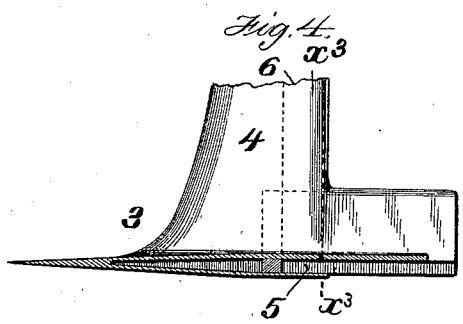
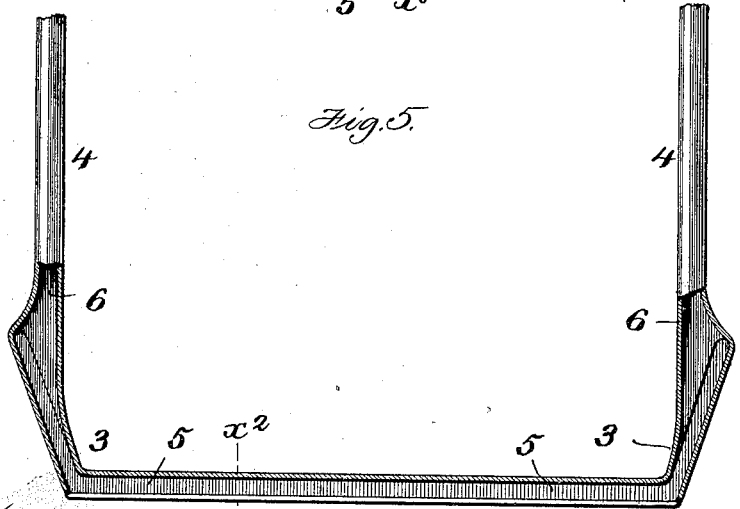
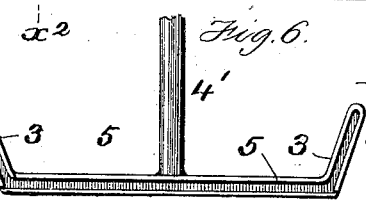
Attest:
H. A. Nott
J. Lavallu
Inventor:
L. O. Tomlinson,
by Robert Burns
Atty.
THE NORRIS PETERS CO., PHOTO-LITHO., WASHINGTON, D. C.

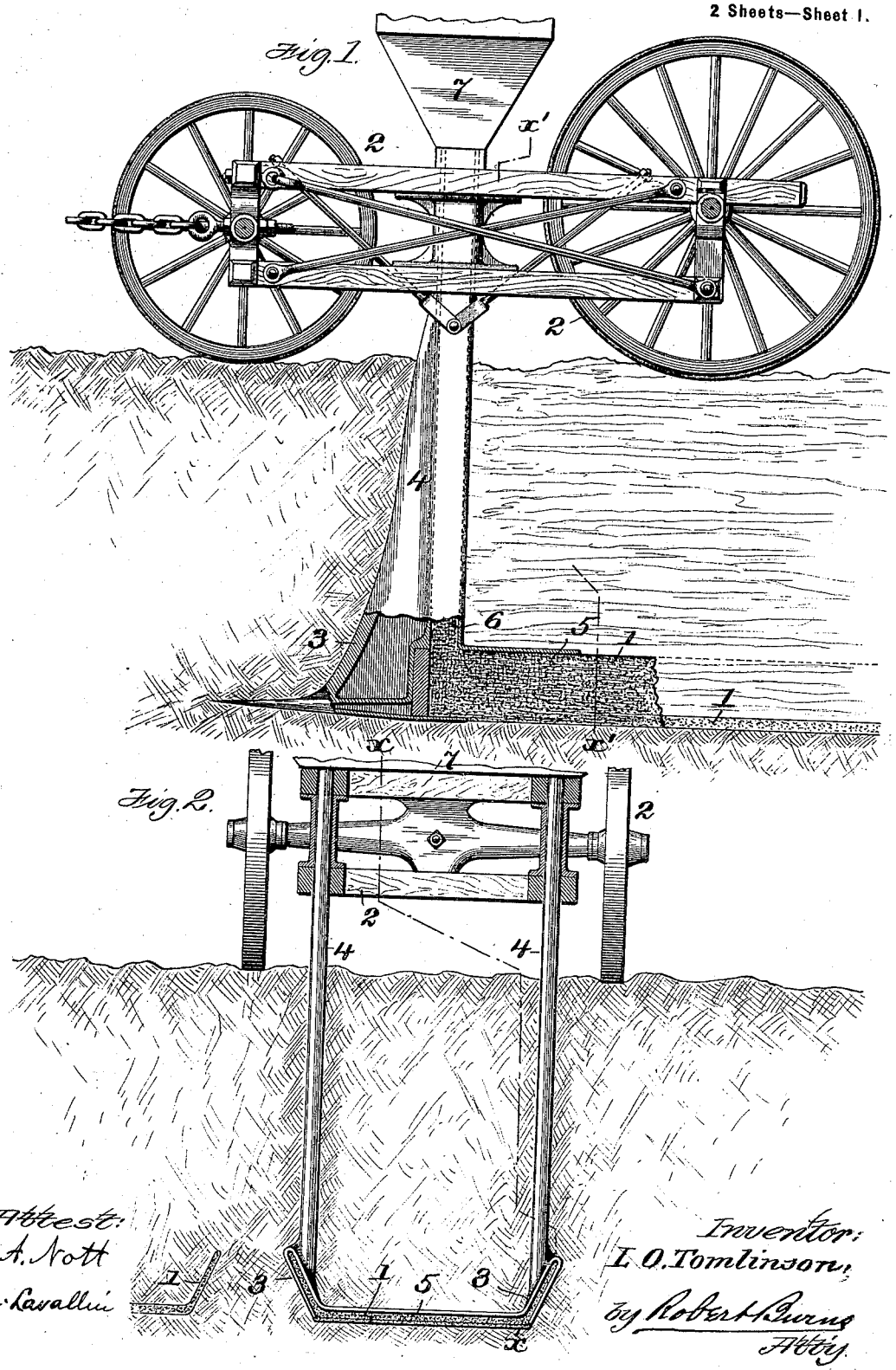

UNITED STATES PATENT OFFICE.

LYMAN O. TOMLINSON, OF CHICAGO, ILLINOIS.

SYSTEM OF IRRIGATING ARID SOILS.

SPECIFICATION forming part of Letters Patent No. 668,362, dated February 19, 1901.

Application filed January 25, 1897. Serial No. 620,663. (No model.)

*To all whom it may concern:*

Be it known that I, LYMAN O. TOMLINSON, a citizen of the United States, residing at Chicago, in the county of Cook and State of Illinois, have invented a certain new and useful System of Fertilizing Arid Soils; and I do hereby declare the following to be a full, clear, and exact description of the same, reference being had to the accompanying drawings, forming a part of this specification.

The present invention has for its object the production of a water-filled stratum of earth at a suitable distance below the surface of the ground for the perpetual nourishment of the vegetation on the surface. To secure this water-filled stratum of earth, a series of reservoirs are formed of cement or other indestructible material, laid in such a manner that the greater portion of the land is underlaid with reservoirs, which intercept the rainfall as it sinks into the earth to secure a permanent water-filled stratum of earth that is only exhausted by plant absorptions, evaporation, or a long-continued drought, in which the lack of a rainfall fails to replenish the waste of a heated term. The present system is entirely different from and has no relation with systems of distribution of water for underground irrigation, &c., and no agents are required but gravity and the necessary rainfall to enable the husbandman under the present method to make the "desert blossom as the rose." It is not irrigation, but a fundamental change in the condition of the soil, a perennial and free supply of what arid soils most need. I attain such objects by the use of means and apparatus substantially as shown in the accompanying drawings, in which—

Figure 1 is a longitudinal sectional elevation at line $x\ x$, Fig. 2; Fig. 2, a transverse section of the same at line $x'\ x'$, Fig. 1; Fig. 3, a detail perspective view of the underground plow or mole by which the open-topped intercepting-troughs of the present invention are formed *in situ* underground; Fig. 4, a detail longitudinal section of the same at line $x^2\ x^2$, Fig. 5; Fig. 5, a detail transverse section of the same at line $x^2\ x^2$, Fig. 4; Fig. 6, a rear end elevation, illustrating a modified form of the plow or mole.

Similar numerals of reference indicate like parts in the several views.

As illustrated in the accompanying drawings, the present improved system of fertilizing arid soils comprises a series of open-topped retaining trays or troughs 1, arranged a suitable distance below the surface of the soil and preferably placed side by side, as shown, with narrow intervening spaces between such trays or troughs to admit of the passage-way of an oversurplus of water after the trays or troughs are filled. As so arranged the series of open-topped trays or troughs 1 are adapted to receive and hold an ample supply of moisture to supply a growing crop during an extended interval of drought, as well as to receive, store, and economically supply water of irrigation, applied at regular intervals, to the soil. In addition to the above functions the open-topped trays or troughs act to receive and retain any manures or fertilizers applied to the soil in a position adjacent to the roots of the growing crop, so as to effectively utilize the same in feeding and nourishing such crop. The series of trays or troughs 1 may be of any desired size and shape and may be placed underground in any suitable and practical manner. In the accompanying drawings I have illustrated means for laying the same in the ground in the form of continuous troughs of beton or other concrete or cement and preferably of a continuous and monolithic nature.

In the construction shown, 2 is a wheeled truck that is moved across the field by any usual means, either animal power applied direct or by connection with power mechanisms at the respective sides or ends of the field to be improved, as usual in ordinary plowing systems.

3 is a subterranean plow or mole attached by one or more vertical standards 4 to the framed portion of the wheeled truck 2 in a rigid and substantial manner, so that with the movements of the truck along the surface of the ground an underground channel will be formed in the soil at the required distance below the surface by the plow or mole 3. The connecting standard or standards 4 will have a narrow formation transversely, as shown, so as to make but a narrow incision in the soil. The construction of plow so far described is usual to the well-known wheel-plow for forming underground channels for drainage purposes.

In the present invention the mole or plow 3 is formed at its rear end with a cement-distributing chamber 5, that opens backward, as shown, so as to fill the underground channel with cement as fast as such channel is formed by the forward movement of the plow.

Cement or other analogous plastic composition is fed to the mole or plow chamber 5 through passages 6 in the plow-standards 4 from a suitable tank 7, carried by the truck 2, and the flow of such cement may be either by gravity alone or by any usual suitable positive means, as particular circumstances may suggest.

In the construction of the above-described means for laying the underground troughs 1 of the present invention it is preferable to use duplicate connecting-standards 4 for each plow or mole, that have connection with the respective sides of the plow, as illustrated in Figs. 1, 2, 3, 4, and 5, in that such arrangement affords better and more efficient means for distributing the cement to the distributing-chamber 5 of the plow or mole 2, more especially when such chamber 5 is made of some transverse width to form an open-topped trough of a corresponding width. It is, however, within the scope of this part of my present invention to use a central tubular standard 4', as illustrated in Fig. 6.

Having thus fully described my said invention, what I claim as new, and desire to secure by Letters Patent, is—

The herein-described means for fertilizing arid soils, comprising a series of open-topped trays or reservoirs placed entirely below the surface of the soil and adapted to intercept rainfalls and to form a water-filled stratum of earth at a distance below the surface.

In testimony whereof witness my hand this 22d day of January, 1897.

LYMAN O. TOMLINSON.

In presence of—
ROBERT BURNS,
JAMES LAVALLIN.